(12) United States Patent
Herley et al.

(10) Patent No.: US 12,261,858 B2
(45) Date of Patent: Mar. 25, 2025

(54) DETECTING AND MITIGATING ABUSIVE NETWORK ACTIVITY BASED ON VERSIONED BROWSER USAGE

(71) Applicant: Microsoft Technology Licensing, LLC, Redmond, WA (US)

(72) Inventors: Cormac E. Herley, Bellevue, WA (US); Fang Tu, Shoreline, WA (US); Jayadev Pillai, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 295 days.

(21) Appl. No.: 17/852,267

(22) Filed: Jun. 28, 2022

(65) Prior Publication Data

US 2023/0421580 A1    Dec. 28, 2023

(51) Int. Cl.
*H04L 9/40* (2022.01)
(52) U.S. Cl.
CPC ...... *H04L 63/1416* (2013.01); *H04L 63/1425* (2013.01); *H04L 63/1458* (2013.01); *H04L 63/20* (2013.01)
(58) Field of Classification Search
CPC ............. H04L 63/1416; H04L 63/1425; H04L 63/1458; H04L 63/20; H04L 63/1466
See application file for complete search history.

(56) References Cited

U.S. PATENT DOCUMENTS

| | | | |
|---|---|---|---|
| 10,031,980 B2 * | 7/2018 | Acuna | G06F 16/24578 |
| 10,740,094 B2 * | 8/2020 | Sagy | G06F 8/71 |
| 10,997,290 B2 | 5/2021 | Shafet et al. | |
| 2011/0320816 A1 | 12/2011 | Yao et al. | |
| 2019/0122258 A1 | 4/2019 | Bramberger et al. | |
| 2020/0336496 A1 | 10/2020 | Modalavalasa et al. | |

(Continued)

FOREIGN PATENT DOCUMENTS

CN    111181912 A    5/2020

OTHER PUBLICATIONS

"How to Detect IVT using your Own Analytics", Retrieved from: https://fraud0.com/resources/how-to-detect-bot-traffic-using-your-own-analytics-ultimate-guide/#i3, Mar. 2022, 19 Pages.

(Continued)

*Primary Examiner* — Sm A Rahman
(74) *Attorney, Agent, or Firm* — Weaver IP L.L.C.

(57) ABSTRACT

Methods for detecting and mitigating abusive network activity based on versioned browser usage are performed by systems and devices. Usage values for network activity of legacy web browser versions are determined, where the usage values represent benign network activity associated with active instances of the legacy versions over prior time periods. The number of active instances of legacy browser versions is assumed to generally be monotonically decreasing over time, and thus a bound of benign network activity for each of the legacy versions can be estimated by associating an approximate percentage of benign traffic with a minimum past usage value. Current network activity is monitored to determine current usage values for the legacy versions, and network actions are performed based on current usage values deviating from past usage values according to the bound.

20 Claims, 5 Drawing Sheets

(56) References Cited

U.S. PATENT DOCUMENTS

2021/0400065 A1   12/2021  Herley et al.
2022/0263853 A1*  8/2022  Izrael .................. H04L 63/1433

OTHER PUBLICATIONS

Hughes, Karl, "Bot Detection: Identifying Bot Traffic with Open-Source Browser Fingerprinting Techniques", Retrieved from: https://fingerprint.com/blog/bot-detection/, Jun. 3, 2021, 11 pages.

Suchacka, et al., "Identifying Legitimate Web Users and Bots with Different Traffic Profiles—An Information Bottleneck Approach", In Journal of Knowledge-Based Systems, vol. 197, Jun. 7, 2020, 18 Pages.

Bortolameotti, et al., "DECANTeR: DEteCtion of Anomalous outbound HTTP TRaffic by Passive Application Fingerprinting", In Proceedings of the 33rd Annual Computer Security Applications Conference, Dec. 4, 2017, pp. 373-386.

"International Search Report and Written Opinion Issued in PCT Application No. PCT/US23/022617", Mailed Date: Jul. 19, 2023, 14 Pages.

* cited by examiner

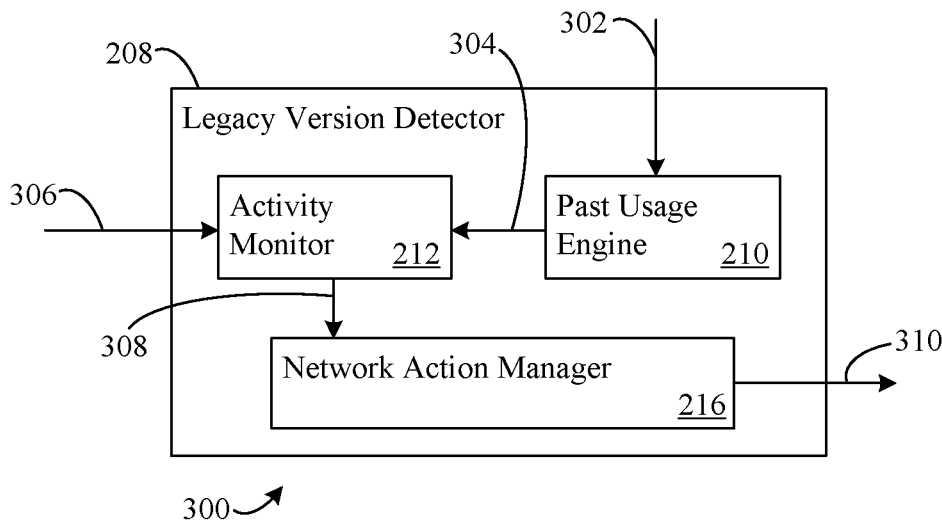

FIG. 3

| |
|---|
| Generate a past usage value for a legacy version of a web browser wherein the legacy version of the web browser is older than a current version of the web browser, wherein the past usage value represents benign network activity associated with active instances of the legacy version over the past time period, and wherein the past usage value corresponds to a portion of a past time period  ~402 |
| Monitor current network activity over a current time period  ~404 |
| Determine a current usage value for the legacy version of the web browser over the current time period  ~406 |
| Perform a network action based at least on the current usage value deviating from the past usage value  ~408 |

FIG. 4

DETECTING AND MITIGATING ABUSIVE NETWORK ACTIVITY BASED ON VERSIONED BROWSER USAGE

BACKGROUND

Detecting bot and scripted abusive network activity from transmitted communications and data is difficult for typical hosts on a network. Current bot and scripted abusive network activity solutions are not well suited for supervised machine learning approaches, such as support-vector machine models, logistic regression, etc., as the data associated with bot and abusive network activity generally lacks labels. Additionally, current bot and scripted abusive network activity solutions are not well suited for unsupervised machine learning approaches, such as clustering by K-means, isolation forests, etc., as these approaches are not well suited for categorical features.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for detecting and mitigating abusive network activity based on versioned browser usage are performed by systems and devices. Usage values for network activity of legacy web browser versions are determined, where the usage values represent benign network activity associated with active instances of the legacy versions over prior time periods. The number of active instances of particular legacy browser versions is assumed to generally be monotonically decreasing over time, and thus an upper bound of benign network activity for each of the legacy versions can be estimated by associating an approximate percentage of benign traffic with a minimum past usage value. Current network activity is monitored to determine current usage values for the legacy versions, and network actions are performed based on current usage values deviating from past usage values according to the upper bound.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a flow diagram for detecting and mitigating abusive network activity based on versioned browser usage, in accordance with an example embodiment.

FIG. 4 shows a flowchart for detecting and mitigating abusive network activity based on versioned browser usage, in accordance with an example embodiment.

Figure 1:
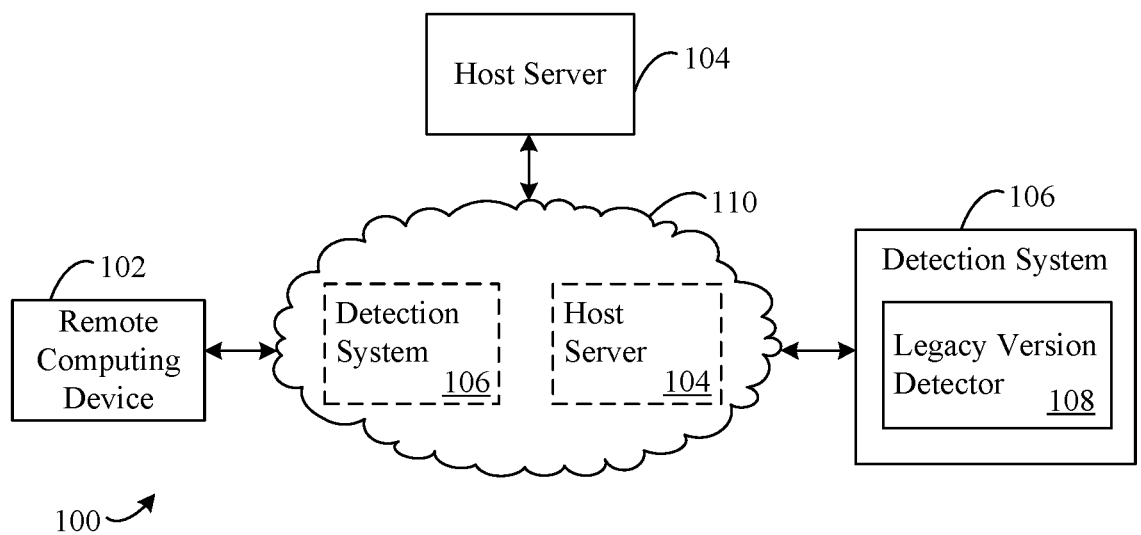
FIG. 1 shows a block diagram of a system for detecting and mitigating abusive network activity based on versioned browser usage, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for detecting and mitigating abusive network activity based on versioned browser usage. Section III below describes example computing device embodiments that may be used to implement features of the embodiments described herein. Section IV below describes additional examples and advantages, and Section V provides some concluding remarks.

II. Example Aspects for Detecting and Mitigating Abusive Network Activity Based on Versioned Browser Usage When traffic such as network activity is from a web browser that pushes version updates to user devices by default (e.g., Google Chrome®, Microsoft Edge®, Mozilla Firefox®, etc.), the likelihood of network activity being from a bot or via script can be robustly estimated.

Bot traffic may be any non-human network traffic to a resource accessible through a network, such as a website, application ("app"), and/or online service. Software applications or scripts running automated tasks may generate and control bot traffic. In reference to the aspects described herein, bot and scripted network activity may be used synonymously unless otherwise stated. Bots may perform repetitive tasks and do so at a rate much faster than humans, and although some bots facilitate useful services (such as search engines and website monitoring), other bots are utilized for malicious or abusive purposes that cause undesired/damaging effects for hosts or, at the very least, are a nuisance. For example, a bot may target a website or host server and overwhelm it with traffic sufficient to crash the website. As another example, bots may perform online guessing attacks against password servers. Because of the possible negative impacts of bot and scripted traffic, online service providers and hosts may benefit from tools that detect and mitigate, e.g., punish, bot and scripted network activity.

If most legitimate users are on recent versions web browsers, it could be presumed that traffic from older, legacy versions can be considered as originating from a bot or script. However, there are scenarios that preclude this presumption, particularly if a robust, accurate detection of abusive traffic is sought. Certainly, disabling automatic updates is uncommon; however, specific hardware or policy constraints can cause certain legacy versions of web browsers to persist for long periods of time.

For example, machines running Windows XP® cannot upgrade beyond version Chrome49 for the Google Chrome® web browser, so a relatively small but persistent share of all network activity comes from this one legacy version. Likewise, some organizations may have updates disabled for different reasons. Therefore, it can be seen that a non-negligible amount of legitimate network activity originates from arbitrary legacy versions of different web browsers, and while much traffic from legitimate, benign users comes from recent versions of web browsers, this alone is not enough to accurately mark network activity from older versions as abusive (e.g., as being scripted or bot traffic).

While false positives are probably more expensive than false negatives, e.g., blocking traffic from legitimate users is less acceptable than allowing traffic from bots, aspects herein allow an amount of legitimate traffic from legacy versions without requiring system constraints such as curated lists of exceptions which do not scale and require continual, manual maintenance and updates.

As noted herein, the fraction of legitimate, benign users on any particular legacy version of a web browser will be non-increasing, e.g., will exhibit monotonically decreasing characteristics for instances of legacy versions in use. That is, while determining what exact fraction of legitimate, benign network activity is from a given legacy version of a web browser may not be ascertainable, it can be assumed that new installs of legacy web browser version do not occur, or do not occur in any non-negligible numbers. This enables the aspects herein to determine, or learn, the clean, benign distributions of active legacy version instances and network activity across different web browsers that are utilized.

If an assumption is imposed that non-current, or legacy, versions of a given web browser make up a non-increasing fraction of legitimate traffic, the number of instances for older versions of a given web browser that are still in use for legitimate purposes by users are assumed to generally exhibit a monotonically decreasing number over time. Implementing this characteristic of monotonicity enables the monitoring of usage for the legacy versions over past time periods, e.g., over weeks or months, etc.) to converge on a clean, or benign, distribution. The aspects described herein have high precision: bot traffic from current versions may cause false negatives, but as the benign distribution of legacy versions can be overestimated, false positives for abusive network activity detection from scripts, bots, and/or the like, are very rare.

Detecting abusive network activity in prior solutions is difficult as labels used in supervised Machine Learning (ML) approaches are generally not available. The instant aspects described herein improve detection by providing an extremely robust way to estimate the clean, benign distribution of browser versions and their activity over time. As the percentage of benign network activity from legacy browser versions is assumed to be monotonically non-increasing, imposing this monotonicity constraint over long time periods enables the convergence to the benign distributions. Thus, the aspects herein provide improvements over supervised approaches (e.g., logistic regressions, support-vector machine models (SVMs), etc.) in that labeling data is not required, and similar improvements are provided over unsupervised approaches (e.g., clustering such as K-means, isolation forests, etc.) in that aspects herein work efficiently and effectively with categorical features.

Accordingly, methods for detecting and mitigating abusive network activity based on versioned browser usage are performed by systems and devices. Usage values for network activity of legacy web browser versions are determined, where the usage values represent benign network activity associated with active instances of the legacy versions over prior time periods. The number of active instances of legacy browser versions is assumed to generally be monotonically decreasing over time, and thus an upper bound of benign network activity for each of the legacy versions can be estimated by associating an approximate percentage of benign traffic with a minimum past usage value. Current network activity is monitored to determine current usage values for the legacy versions, and network actions are performed based on current usage values deviating from past usage values according to the upper bound.

For instance, consider the distribution, $P(v_k|F)$, of versions of a particular browser family F. The vector $v_k$ is a categorical feature with a bin for each implemented browser version that has been monitored. Because this changes with time, the distribution can be indexed by day: $P_n(v_k|F)$, where this distribution represents versions k for a given browser family F on day n, for example.

As noted above, network activity received by a given host is a mixture of traffic that is bot and traffic that is not bot ("!bot" herein), and this relationship can be written as follows for Equation 1:

$$P_n(v_k|F) = \alpha_n \cdot P_n(v_k|F, !bot) + (1-\alpha_n) \cdot P_n(v_k|F, bot), \quad \text{(Eq. 1)}$$

where $0 < \alpha_n \leq 1$ is the fraction of network activity that is legitimate, or benign, on a given day n. Once aversion of a web browser is no longer current, e.g., anew version is released as the current version, that version becomes a legacy version and has a share of the population of all versions that is non-increasing, or that is monotonically decreasing over time. For instance, it follows then that for an Eq. 1.1:

$$P_n(v_k|F, !bot) \leq P_{n-1}(v_k|F, !bot), \text{ for } n-n_k > i > 0, \quad \text{(Eq. 1.1)}$$

where $n_k$ is the day that version $v_k$ switched from being the current version to being a legacy version of the web browser F (e.g., the day the version was superseded).

From Equation 1 and the assumption of monotonicity shown above for Equation 1.1, it can be shown for an Equation 1.2 that:

$$P_n(v_k|F, !bot) = \frac{P_n(v_k|F)}{\alpha_n} - \frac{1-\alpha_n}{\alpha_n} \cdot P_n(v_k|F, bot), \quad \text{(Eq. 1.2)}$$
$$\leq \frac{P_n(v_k|F)}{\alpha_n}$$

That is, the benign distribution is always smaller than the observed traffic once a normalization is performed via an. Even though an may not be empirically known, the worst-case for this parameter can be considered. For example, suppose that a lower bound on the fraction of network activity that is benign is assumed to be $\alpha_n > \alpha_{wc} \; \forall n$. Under this association, by way of illustrative example, if network activity is never observed to be more than 40% bot or scripted, this yields $\alpha_{wc} = 0.6$, representing 60% of remaining traffic for the assumed benign portion.

From the above, the following estimate, represented by $\hat{P}$ in Equation 2 below, may be defined for the aspects described herein as:

$$\hat{P}_n(v_k|F, !bot) \triangleq \min_{n-n_k > i > 0} \frac{P_{n-i}(v_k|F)}{\alpha_{wc}} \geq P_{n-i}(v_k|F). \quad \text{(Eq. 2)}$$

To examine tightness of the estimate, it should be noted that on a portion of a time period where version $v_k$ does not receive any attack/abuse traffic (e.g., $P_n(v_k|F, bot) = 0$), then:

$$\frac{P_{n-i}(v_k|F)}{P_{n-i}(v_k|F, !bot)} = \frac{\alpha_{n-i}}{\alpha_{wc}}. \quad \text{(Eq. 2.1)}$$

Accordingly, on those portions of time periods, an overestimation of $P_{n-i}(v_k|F, !bot)$ by $\alpha_{n-i}/\alpha_{wc}$ may be utilized. This estimate improves with time, and may be run for days, weeks, months, or longer. With enough time, the over-estimating converges to approximately the minimum over i for $\alpha_{n-i}/\alpha_{wc}$.

Many, or most, legacy versions of web browsers go extinct for legitimate or benign traffic. In such cases, when $P_n(v_k|F) = 0$, the estimate disclosed herein will be very accurate (i.e., cases where legitimate traffic from a given version is extinct are correctly detected, or are below what can be measured). Thus, identification of effectively extinct versions may be realized if there is even a single day in a log-set of network activity where that version sees no attack/abusive traffic.

With the estimate of clean, benign network activity from Equation 2, an estimate of the likelihood of abusive network activity, from Equation 1, is provided in Equation 3 below as:

$$\frac{P_n(bot|v_k, F)}{P_n(!bot|v_k, F)} = \frac{P_n(v_k|F)}{\alpha_n \cdot \hat{P}_n(v_k|F)} - 1. \quad \text{(Eq. 3)}$$

It should be noted that Equation 2 gives an estimate for the clean distribution only for versions that are no longer current. The monotonicity constraint may not apply to current versions, in aspects herein, and thus these current versions may be essentially left alone. The boundary between current and legacy versions may vary in different aspects, and may be determined by a number of versions, an amount of time, a number of estimated legitimate instances of a version, and/or the like.

Thus, to improve on existing solutions, the described detection and mitigation for abusive network activity based on versioned browser usage enable deviations for abusive traffic to be detected based on detected usage, or network activity, of legacy web browser versions. Accordingly, the embodiments herein provide solutions that improve systems hosting applications and/or services accessed by web browser applications, and versions thereof. These and other embodiments will be described in further detail below in association with the Figures, and in the Sections/Subsections that follow.

Systems, devices, and apparatuses may be configured in various ways for detecting and mitigating abusive network activity based on versioned browser usage. For instance, FIG. 1 is a block diagram of a system 100, according to embodiments. System 100 is configured for detecting and mitigating abusive network activity based on versioned browser usage, according to embodiments. As shown in FIG. 1, system 100 includes a remote computing device 102 (also "remote device" 102 herein), a host server 104, and a detection system 106 that communicate in embodiments with each other over a network 110. It should be noted that in various embodiments different numbers of remote devices, detection systems, networks, and/or host servers are present, and additionally, according to embodiments, any combination of the systems and/or components illustrated in FIG. 1 are present in system 100. For example, embodiments of system 100 having cloud- and/or network-based systems and devices are included herein, where embodiments enable detecting and mitigating abusive network activity based on versioned browser usage.

Network 110 comprises different numbers and/or types of communication links that connect computing devices and hosts/servers such as, but not limited to, the Internet, wired or wireless networks and portions thereof, point-to-point connections, local area networks, enterprise networks, cloud networks, and/or the like, in embodiments. For example, as exemplarily illustrated, network 110 may comprise the Internet, a cloud-based platform or architecture, an enterprise network, etc., and may include detection system 106 and/or host server 104, at one or more geographic locations. In another example, network 110 may be a cloud-based platform network and/or enterprise network to which host server 104 and/or detection system 106 connect via the Internet or another network. Additionally, remote device 102, host server 104, and/or detection system 106 may be implemented in any number or combination of network types.

Figure 2:
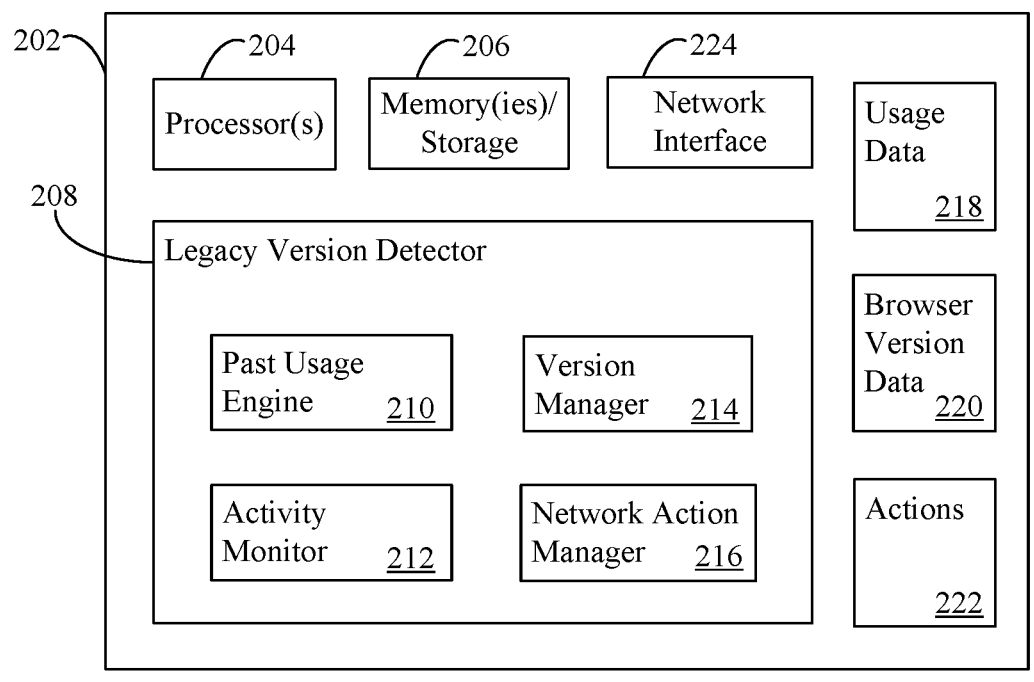
FIG. 2 shows a block diagram of a computing system configured for detecting and mitigating abusive network activity based on versioned browser usage, according to an example embodiment.

Remote device 102, in aspects, includes any number, type, or combination of other computing devices and/or computing systems, including a terminal, a personal computer, a laptop computer, a tablet device, a smart phone, a personal digital assistant, a server(s), a gaming console, network infrastructure (e.g., routers, gateways, etc.), and/or the like, that may include internal/external storage devices, that are utilized to access services and/or applications, and/or to otherwise upload and/or download any type of information, data, files, programs, and/or the like, to/from hosts such as host server 104. In embodiments, remote device 102 comprises one or more server computers or computing devices, which may include one or more distributed or "cloud-based" servers. In embodiments, remote device 102 is associated with, or is a part of, a cloud-based service platform, and in some embodiments, remote device 102 comprises an on-premises server(s) in addition to, or in lieu of, cloud-based servers. Remote device 102 also includes additional components (not shown for brevity and illustrative clarity) including, but not limited to, components and subcomponents of other devices and/or systems herein, e.g., as shown in FIG. 2 and/or FIG. 9 described below, in accordance with embodiments.

Remote device 102 may be configured to transmit bot or scripted traffic/network activity to host server 104 over network 110, e.g., via a web browser application as described herein. While only a single instance of remote device 102 is shown or illustrative clarity, any number of instances are contemplated for various aspects of the instant disclosure, and any of such instances may execute any number of, type of, and/or version of web browser applications.

Host server 104 comprises one or more server computers or computing devices, which may include one or more distributed or "cloud-based" servers. In embodiments, host server 104 is associated with, or is a part of, a cloud-based service platform, and in some embodiments, host server 104 comprises an on-premises server(s) in addition to, or in lieu of, cloud-based servers. Host server 104 is configured to host or provide any types of services, applications, and/or the like, which may be accesses via network 110 from one or more instances of remote device 102. As illustrative examples, the services, applications, etc., may include Office 365® offerings from Microsoft Corp. of Redmond, WA, while host server 104 is configured to host and execute any type of service and/or application accessed/utilized by a user of, or entity associated with, remote device 102 that may include the transfer of data, information, files, etc., e.g., a DB server application, an email application/service, a document sharing service, productivity applications, etc. (not shown for brevity and illustrative clarity). Host server 104 is configured to receive network activity in the form of electronic transmissions over network 110, which may include abusive bot or scripted traffic.

In this context, detection system 106 is configured for detecting and mitigating abusive network activity based on versioned browser usage.

Detection system 106, in embodiments, comprises one or more computers or computing devices. Detection system 106 in various embodiments includes any number, type, or combination of other computing devices and/or computing systems, including a terminal, a personal computer, a laptop computer, a tablet device, a smart phone, a personal digital assistant, a server(s), a gaming console, network infrastructure (e.g., routers, gateways, etc.), a proxy server(s), and/or the like, that may include internal/external storage devices. Detection system 106 is configured to detect and mitigate abusive network activity from instances of remote device 102. In embodiments, detection system 106 is associated with a cloud-based service platform in which host server 104 is a member of a tenancy. Additionally, as noted above, detection system 106 is configured to communicate with host server 104 via electronic communications over network 110 and/or a cloud infrastructure. Detection system 106 may comprise a portion of host server 104, in various aspects contemplated herein.

As shown in FIG. 1, detection system 106 includes a legacy version detector 108. In embodiments, legacy version detector 108 is a portion of a bot/script detection suite for abusive network activity as implemented by detection system 106. Legacy version detector 108 is configured for detecting and mitigating abusive network activity based on versioned browser usage. In some aspects, legacy version detector 108 intercepts network activity of host server 104, while in other aspects, host server 104 may provide information regarding its network activity to legacy version detector 108. In either scenario, legacy version detector 108 is configured to monitor network activity, detect abnormal traffic usage for legacy web browser versions, and take appropriate network action(s). Further details regarding legacy version detector 108 are provided below.

Detection system 106 also includes additional components (not shown for brevity and illustrative clarity) including, but not limited to, components and subcomponents of other devices and/or systems herein, e.g., as shown in FIGS. 2 and/or 9 described below, in embodiments.

As noted and described herein, computing devices and systems are applicable to any type of system for detecting and mitigating abusive network activity based on versioned browser usage, according to embodiments. One example of implementations noted above are network, or "cloud," implementations, applications, or services in a network architecture/platform. A cloud platform includes a networked set of computing resources, including servers, routers, etc., that are configurable, shareable, provide data security, and are accessible over a network such as the Internet, according to embodiments. Cloud applications/services such as those hosted by remote computing device 102, etc., in various embodiments are configured to run on these computing resources, often atop operating systems that run on the resources, for entities that access the applications/services, locally and/or over the network. A cloud platform is configured to support multi-tenancy, where cloud platform-based software services multiple tenants, with each tenant including one or more users who share common access to software services of the cloud platform. Furthermore, a cloud platform is configured to support hypervisors implemented as hardware, software, and/or firmware that run virtual machines (emulated computer systems, including operating systems) for tenants. A hypervisor presents a virtual operating platform for tenants. In some embodiments herein, tenants of cloud-based implementation services may communicate with cloud-based servers and hosts.

Detection systems herein, such as detection system 106, are configured in various ways for detecting and mitigating abusive network activity based on versioned browser usage via legacy version detector 108. For instance, referring now to FIG. 2, a block diagram of a system 200 is shown for detection system, according to an example embodiment. System 200 is configured to be an embodiment of system 100 of FIG. 1, e.g., detection system 106 and legacy version detector 108. System 200 is described as follows and may reference the described devices, systems, components, etc., shown for system 100 in FIG. 1.

System 200 includes a computing system 202, which is an embodiment of a system, server, or computing device at which a described legacy version detector is implemented, and which is any type of computing device or computing system, as mentioned elsewhere herein or as otherwise known. As shown in FIG. 2, computing system 202 includes one or more processors ("processor") 204, one or more of a memory and/or other physical storage device ("memory") 206, as well as one or more network interfaces ("network interface") 224. Computing system 202 includes a legacy version detector 208, which is an embodiment of legacy version detector 108 in FIG. 1. In embodiments, while not shown for brevity and illustrative clarity, computing system 202 includes additional software, applications, and/or additional ones of components illustrated in FIG. 2, as would be understood by one of skill in the relevant art(s) having the benefit of this disclosure.

System 200 also includes additional components (not shown for brevity and illustrative clarity) including, but not limited to, components and subcomponents of other devices and/or systems herein, as well as those described below with respect to FIG. 9, according to embodiments.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 may be multi-core processors configured to execute more than one processing thread concurrently, and cores of processor 204 may be grouped with portions of memory 206. Processor 204 may comprise circuitry that is configured to execute computer program instructions such as, but not limited to, embodiments of legacy version detector 208, including one or more of the components thereof as described herein, which may be implemented as computer program instructions to perform detecting and mitigating abusive network activity based on versioned browser usage, as described herein.

Memory 206 may include volatile storage portions such as a random access memory (RAM), cache(s), etc., and/or persistent storage portions such as hard drives, non-volatile RAM, and/or the like, to store or be configured to store computer program instructions/code as described herein, as well as to store other information and data described in this disclosure including, without limitation, legacy version detector 208, files associated with usage data 218, browser version data 220, and/or actions 222, including one or more of the components thereof as described herein, etc.

Network interface 224 may be any type or number of wired and/or wireless network adapter, modem, etc., configured to enable system 200, including computing system 202, to communicate with other devices and/or systems over a network, including cloud networks, such as communications between computing system 202 and other devices, systems, hosts, etc., of system 100 in FIG. 1 over a network such as network 110 and/or the like.

A web browser application may be any type of web browser application/program and is configured to enable a user, or entity (e.g., a script, a bot, etc.), of a computing device/system to interact with another device/system via the Internet or other network, as described herein and as would be understood by a person of skill in the relevant art(s). For example, remote device 102 of FIG. 1 may communicate with host server 104 via a web browser application. A web browser application may be a Microsoft Edge® browser from Microsoft Corporation of Redmond, WA, a Firefox® browser from Mozilla Corporation of San Francisco, CA, a Safari® browser from Apple, Inc. of Cupertino, CA, a Chrome® browser from Google Inc. of Mountain View, CA, or any other web browser application. Web browser applications may have many versions therefor, including legacy versions that may remain in use long after new, superseding versions are released and/or implemented.

Accordingly, system 200 stores and maintains various web browser data for aspects of detecting and mitigating abusive network activity based on versioned browser usage. For instance, usage data 218 may be stored via memory 206, and comprises observed and/or expected data related to usage for web browser types, versions, etc., as described herein, e.g., for the Equations defined and described above. Usage data 218 may be in the form of distributions for specific versions of a given web browser type/family, and may also include estimations determined for expected data of a given web browser version for a given time period, or portion thereof, as described for Equation 2 above. Browser version data 220 stores information and data related to active and extinct web browser versions for a web browser type/family, and may also be stored in memory 206.

Actions 222 are also stored by system 200 in memory 206, in various aspects herein. Actions 222 may include a list of network actions that may be taken based at least on current usage data that deviates, or not, from expected usage data. Actions 222 may also include scripts, applications, functions/routines, network settings and parameters, and/or the like, in some aspects. The network actions of actions 222 may comprise tiered responses to detected abusive traffic where the tier selected is based at least on various factors, including but without limitation, an age of the legacy version of the web browser, a magnitude of the current usage value, a comparison of the current usage value to the past usage value, a correspondence of the current usage value to a geographic location (including regions), a correspondence of the current usage value to an operating system, and/or the like. Similarly, tiers for network actions may be graded, e.g., high to low, based on threat level and parameters, and my include actions such as, but not limited to, blocking future network activity for the legacy version of the web browser (e.g., high), issuing a human-capable challenge for the legacy version of the web browser (e.g., medium-high), issuing a human-capable challenge for the legacy version of the web browser that corresponds to the geographic location or to the operating system (e.g., medium-low), allowing the future network activity (e.g., low), and/or the like. A decrease in quality of service (QoS) for the future network activity may also be implemented in one or more tiers exemplarily described above, in lieu of or in addition thereto.

Legacy version detector 208 includes a plurality of subcomponents that perform various aspects of detecting and mitigating abusive network activity based on versioned browser usage. For example, as illustrated, legacy version detector 208 includes a past usage engine 210, an activity monitor 212, a version manager 214, and a network action manager 216. Past usage engine 210 is configured to generate a past usage value for a legacy version of a web browser wherein the legacy version of the web browser is older than a current version of the web browser, wherein the past usage value represents benign network activity associated with active instances of the legacy version over the past time period, and wherein the past usage value corresponds to a portion of a past time period. In some aspects herein, a given past usage value may be obtained based at least on Equation 2 described above. Activity monitor 212 is configured to monitor current network activity over a current time period, and to determine a current usage value for the legacy version of the web browser over the current time period. Network action manager 216 is configured to perform a network action based at least on the current usage value deviating from the past usage value. Version manager 214 is configured to identify a new version of the web browser that has been implemented at an implementation time based on the current network activity, and to assign the current version of the web browser as another legacy version of the web browser.

Further details regarding legacy version detector 208 are provided below. For example, FIGS. 3 and 4 will now be described.

FIG. 3 shows a flow diagram 300 for detecting and mitigating abusive network activity based on versioned browser usage, according to an example embodiment. Flow diagram 300 is provided in the context of legacy version detector 208 of FIG. 2. FIG. 4 shows a flowchart 400 for detecting and mitigating abusive network activity based on versioned browser usage, according to example embodiments. System 100 in FIG. 1 and/or system 200 in FIG. 2, e.g., via legacy version detector 208, operate according to flow diagram 300 and flowchart 400 (which may be an embodiment of flow diagram 300 of FIG. 3).

Further structural and operational examples will be apparent to persons skilled in the relevant art(s) based on the following descriptions. Flow diagram 300 and flowchart 400 are described below with respect to system 100 in FIG. 1 and system 200 of FIG. 2.

As noted above, flow diagram 300 illustrates legacy version detector 208 of FIG. 2. As shown, legacy version detector 208 includes past usage engine 210, activity monitor 212, and network action manager 216. In step 302, usage data 218 is received by past usage engine 210.

Turning also now to FIG. 4, flowchart 400 begins at step 402. In step 402, a past usage value for a legacy version of a web browser is generated wherein the legacy version of the web browser is older than a current version of the web browser, wherein the past usage value represents benign network activity associated with active instances of the legacy version over the past time period, and wherein the past usage value corresponds to a portion of a past time period. For instance, past usage engine 210, as illustrated in flow diagram 300, receives at step 302 usage data 218. From usage data 218, past usage engine 210 is configured to generate a past usage value, e.g., based on Equation 2 described above.

Referring again to flow diagram 300, the past usage value generated in flowchart 400 and step 402 is provided to activity monitor 212 in step 304. Additionally, in step 306, activity monitor 212 receives and monitors network traffic.

Referring again to FIG. 4, flowchart 400 continues at step 404 in which current network activity is monitored over a current time period. For example, network activity is received and monitored by activity monitor 212. Activity monitor 212 is configured to monitor traffic directly or indirectly, in aspects. For example, legacy version detector 208, along with one or more components of system 200, in aspects, may comprise a portion of a host server such as host server 104 of FIG. 1. In such aspects, network activity may be directly monitored by activity monitor 212. Similarly, in other aspects for which legacy version detector 208 comprises a portion of a network infrastructure device, network activity destined for host server 104 can be directly monitored by activity monitor 212. In other aspects, indicia of network activity may be provided in step 306 to activity monitor 212 for indirect monitoring. During monitoring by activity monitor 212, web browser versions may be determined from extracting, sniffing, or otherwise reading header, payload, footer, and/or other information from network packets, as would be understood by persons of skill in the relevant art(s) having the benefit of this disclosure. The amount or distribution of network activities for a given version of a given browser over the current time period may be stored as a portion of usage data 218, as shown in FIG. 2.

In flow diagram 300 of FIG. 3, for step 306 in which activity monitor 212 receives and monitors network traffic, this monitoring may be performed over a time period that is characterized as the current time period.

Referring also again to FIG. 4, flowchart 400 continues at step 406 in which a current usage value for the legacy version of the web browser is determined over the current time period. For instance, activity monitor 212 is configured to perform step 406, as noted herein. In aspects, the current usage value is tracked in real-time, or near real-time, while in other aspects, the current usage value is determined by logs of the monitoring over the time periods. In some aspects, the current time period may be the current day, hour, week, fortnight, month, etc., that includes the current time. In one example where time periods span a day, activity monitor 212 receives and monitors network traffic in step 306 on a daily basis to determine the current usage value for a given web browser version (or more generally, for each active browser version across all different browser types monitored).

In flow diagram 300 of FIG. 3, for step 308, activity monitor 212 is configured to determine when the monitored current usage value deviates from the past usage value, and to provide indicia thereof to network action manager 216. For example, the past usage value for a given version of a given web browser exemplarily determined in Equation 2, provides a bounded value of how much benign, or non-bot/non-script, network activity to be expected for a given time period 'n'. Activity monitor 212 is configured to detect when the current usage value deviates from the expected, bounded past usage value. If more network activity for a given version of a web browser is seen in the current time period, network action manager 216 is notified by activity monitor 212 via step 308 for appropriate action to be taken at step 310.

Referring also again to FIG. 4, flowchart 400 continues at step 408 in which a network action is performed based at least on the current usage value deviating from the past usage value. For instance, network action manager 216 is configured to perform, or cause to be performed, network actions based on the deviation. In various aspects, network action manager 216 takes a tiered approach to actions and punishment actions that is based at least on parameters, as discussed below.

Figure 5:
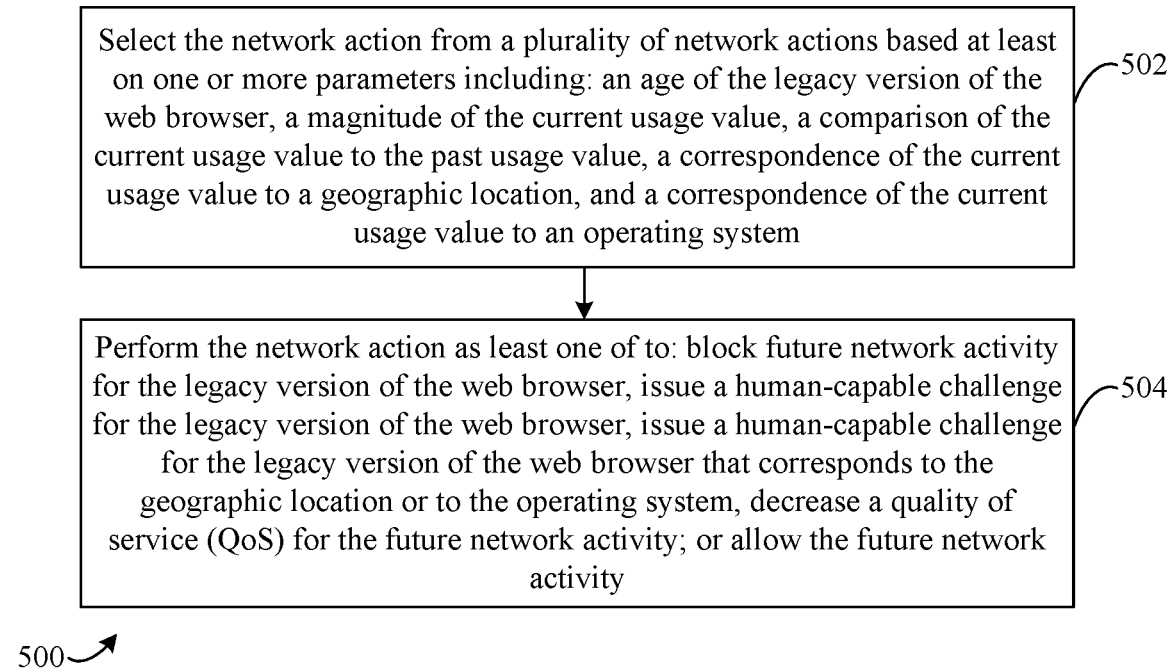
FIG. 5 shows a flowchart for detecting and mitigating abusive network activity based on versioned browser usage, in accordance with an example embodiment.

FIG. 5 will now be described. FIG. 5 shows a flowchart 500 for detecting and mitigating abusive network activity based on versioned browser usage, according to example embodiments. System 100 in FIG. 1 and/or system 200 in FIG. 2, e.g., via legacy version detector 208, operate according to flowchart 500, which may be an embodiment of flow diagram 300 of FIG. 3 and flowchart 400 of FIG. 4. Further structural and operational examples will be apparent to persons skilled in the relevant art(s) based on the following descriptions.

As noted above with respect to legacy version detector 208 in flow diagram 300 and step 408 of flowchart 400, a network action is performed based on deviations of current usage values from past usage values, e.g., current usage values for a browser version are higher than they are estimated, worst case, based on the past usage. Flowchart 500 includes further details regarding these operations, and begins at step 502.

In step 502, the network action is selected from a plurality of network actions based at least on one or more parameters including: an age of the legacy version of the web browser, a magnitude of the current usage value, a comparison of the current usage value to the past usage value, a correspondence of the current usage value to a geographic location, and a correspondence of the current usage value to an operating system. For example, older browser versions may receive less tolerance for deviations in current usage than newer browsers. Likewise, a larger deviation, or simply a large usage value, may require a stronger response, e.g., more of a punishment action, than a smaller deviation. Geographic and operating system correspondences are also factors that network action manager 216 may consider for determining the appropriate action to take.

In step 504, the network action is performed as least one of to: block future network activity for the legacy version of the web browser, issue a human-capable challenge for the legacy version of the web browser, issue a human-capable challenge for the legacy version of the web browser that corresponds to the geographic location or to the operating system, decrease a quality of service (QoS) for the future network activity, or allow the future network activity. For instance, network activity to a host server with a given legacy browser version may be blocked completely. Alternatively, or also additionally, a human-capable challenge may be issued (e.g., determining which pictures displayed have certain characteristics, manipulating the configuration of a presented graphic as directed, typing in letters represented in graphics, and/or the like). In some aspects, challenges may be issued taking geographic and/or operating system characteristics into consideration. QoS may also be impacted as a network action by giving network traffic from the legacy browser version of the web browser a lower priority for handling by the host server. In some aspects, the network action taken is simply to allow the network activity and/or similar future network activity.

Accordingly, the severity and type of network action taken by network action manager 216 is determined based on a number of factors and/or parameters.

Figure 6:
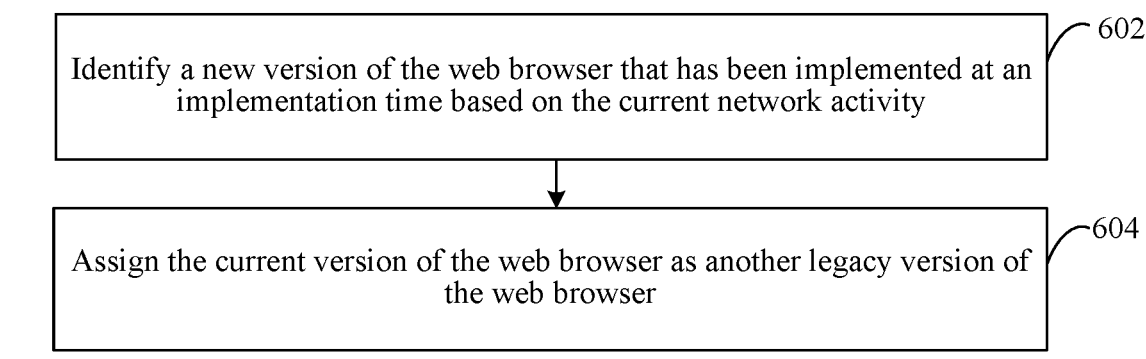
FIG. 6 shows a flowchart for detecting and mitigating abusive network activity based on versioned browser usage, in accordance with an example embodiment.

Turning now to FIG. 6, a flowchart 600 for detecting and mitigating abusive network activity based on versioned browser usage is shown, according to example embodiments. System 100 in FIG. 1 and/or system 200 in FIG. 2, e.g., via legacy version detector 208, operate according to flowchart 600, which may be an embodiment of flow diagram 300 of FIG. 3 and flowchart 400 of FIG. 4. Further structural and operational examples will be apparent to persons skilled in the relevant art(s) based on the following descriptions.

In step 602, a new version of the web browser that has been implemented at an implementation time is identified based on the current network activity. For instance, referring also back again to FIG. 2 and legacy version detector 208, version manager 214 is configured to identify new versions of web browsers that are released and implemented. This identification may be based on data from activity monitor 212, in version identification as described above, and the implementation time may be when a first network activity is detected for the new version, after a specified period of time from the first detection, after a number of detections subsequent to the first detection, and/or the like. In other words, the implementation time for a new browser version may be set as a time when the newer browser version is being more widely adopted. Newly detected versions of a web browser may be included with browser version data 220.

In step 604, the current version of the web browser is assigned as another legacy version of the web browser. For example, version manager 214 is configured to assign current versions of a web browser to be legacy versions. In aspects, the current or legacy status of a browser version may be tracked in browser version data 220. In some aspects, there may be more than one current version of a web browser active at one time. For instance, the most recent versions of a browser, back to 3, 4, 5, etc., most recent versions, may all be considered as current, where the oldest of the current versions is assigned as a legacy version when a most recent version is newly identified at its implementation time as in step 602. In this way, a rolling window of current versions is established, and given that adoption of new versions of web browsers does not happen instantaneously, this rolling window allows for network activity associated with the more recent versions to avoid the scrutiny for potential abusive characteristics, as described herein.

Figure 7:
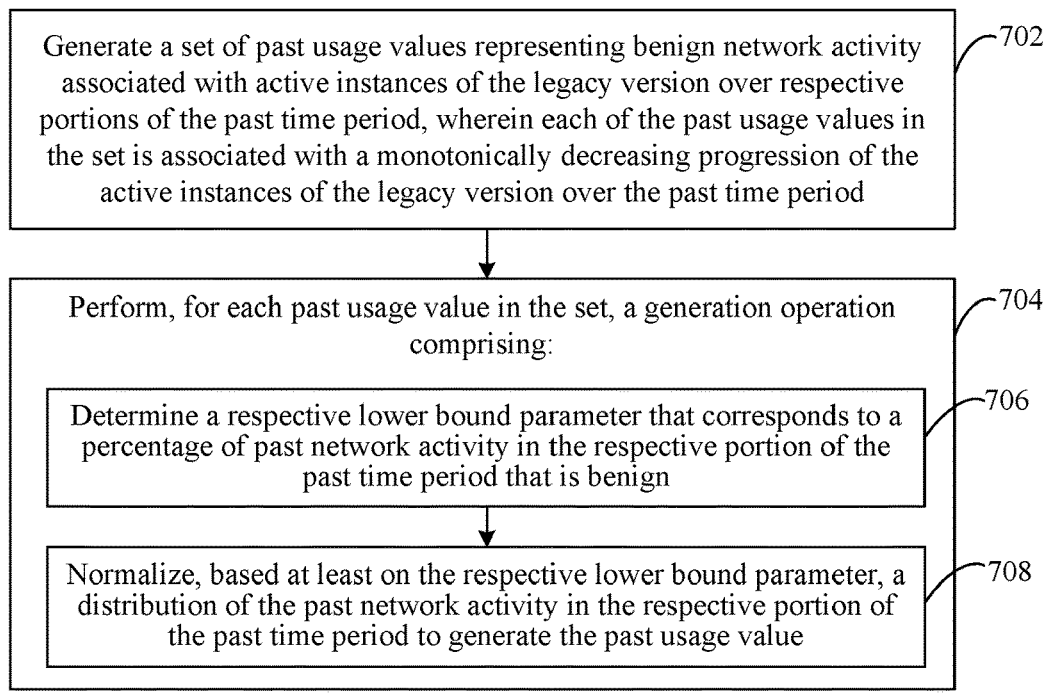
FIG. 7 shows a flowchart for detecting and mitigating abusive network activity based on versioned browser usage, in accordance with an example embodiment.

Turning now to FIG. 7, a flowchart 700 for detecting and mitigating abusive network activity based on versioned browser usage is shown, according to example embodiments. System 100 in FIG. 1 and/or system 200 in FIG. 2, e.g., via legacy version detector 208 and past usage engine 210 thereof, operate according to flowchart 700, which may be an embodiment of flow diagram 300 of FIG. 3 and flowchart 400 of FIG. 4. Flowchart 700 may be a further aspect of step 402 in flowchart 400. Further structural and operational examples will be apparent to persons skilled in the relevant art(s) based on the following descriptions.

In step 702, a set of past usage values representing benign network activity associated with active instances of the legacy version is generated over respective portions of the past time period, wherein each of the past usage values in the set is associated with a monotonically decreasing progression of the active instances of the legacy version over the past time period. For example, past usage engine 210 is configured to generate sets of past usage values representing the benign network activity over respective portions of the past time period. Again, reference is made to Equation 2 and its description above. Each of the past usage values in the set is associated with a monotonically decreasing progression of the active instances of the legacy version over the past time period.

In step 704, a generation operation is performed for each past usage value in the set. Step 704 may include sub-steps, e.g., step 706 and step 708, which comprise the generation operations. Past usage engine 210 is configured perform one or more of these steps.

In step 706, a respective lower bound parameter is determined that corresponds to a percentage of past network activity in the respective portion of the past time period that is benign. Again, reference is made to the Equations and their respective description above, e.g., utilizing $\alpha_{wc}$ in the estimation of the past value for the lower bound.

In step 708, a distribution of the past network activity in the respective portion of the past time period is normalized, based at least on the respective lower bound parameter, to generate the past usage value. Again, reference is made to the Equations, e.g., Equation 2, and their respective description above, e.g., normalizing the distribution $P_{n-i}(v_k|F)$ by $\alpha_{wc}$ in the estimation of the past value as the minimum satisfying the conditional.

Figure 8:
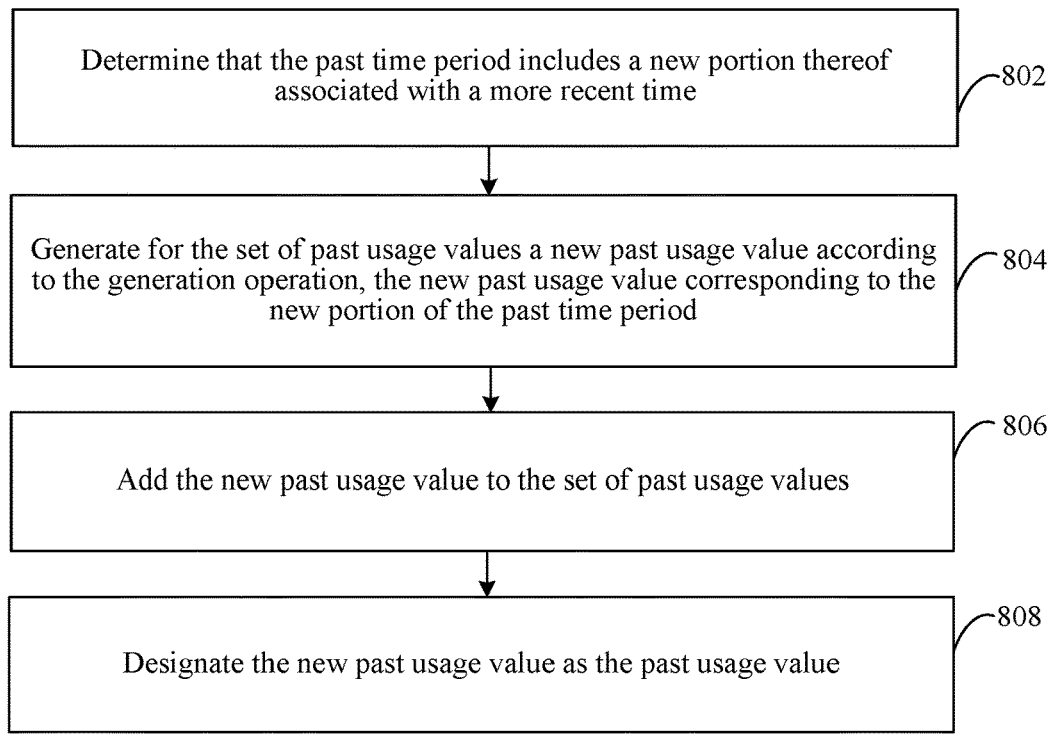
FIG. 8 shows a flowchart for detecting and mitigating abusive network activity based on versioned browser usage, in accordance with an example embodiment.

Turning now to FIG. 8, a flowchart 800 for detecting and mitigating abusive network activity based on versioned browser usage is shown, according to example embodiments. System 100 in FIG. 1 and/or system 200 in FIG. 2, e.g., via legacy version detector 208 and past usage engine 210 thereof, operate according to flowchart 800, which may be an embodiment of flow diagram 300 of FIG. 3 and flowchart 400 of FIG. 4. Flowchart 800 may also be a further aspect of flowchart 700. Further structural and operational examples will be apparent to persons skilled in the relevant art(s) based on the following descriptions.

In step 802, it is determined that the past time period includes a new portion thereof associated with a more recent time. Past usage engine 210 is configured to determine the past time period now has a new portion thereof. For example, if activity monitor 212 receives and monitors network traffic, as described above, on a daily basis to determine the current usage value for a given web browser version, each day it is determined that a new portion, e.g., a new day in this scenario, is added to the overall past time period.

In step 804, a new past usage value is generated for the set of past usage values according to the generation operation, the new past usage value corresponding to the new portion of the past time period. For instance, step 704 of flowchart 700 in FIG. 7 may be performed to generate a new past usage value that is associated with the most recent time period portion (e.g., the most recent day).

In step 806, the new past usage value is added to the set of past usage values. For instance, the new past usage value may be added to usage data 218 in FIG. 2 by past usage engine 210.

In step 808, the new past usage value is designated as the past usage value. For example, the new past usage value may be designated for determining a deviation of a current usage value, as described in flowchart 400 above. That is, the new past usage value, if it satisfies the condition of Equation 2, may be used as the estimate of past usage for a given legacy browser version.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 in FIG. 1 and system 200 in FIG. 2, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 9:
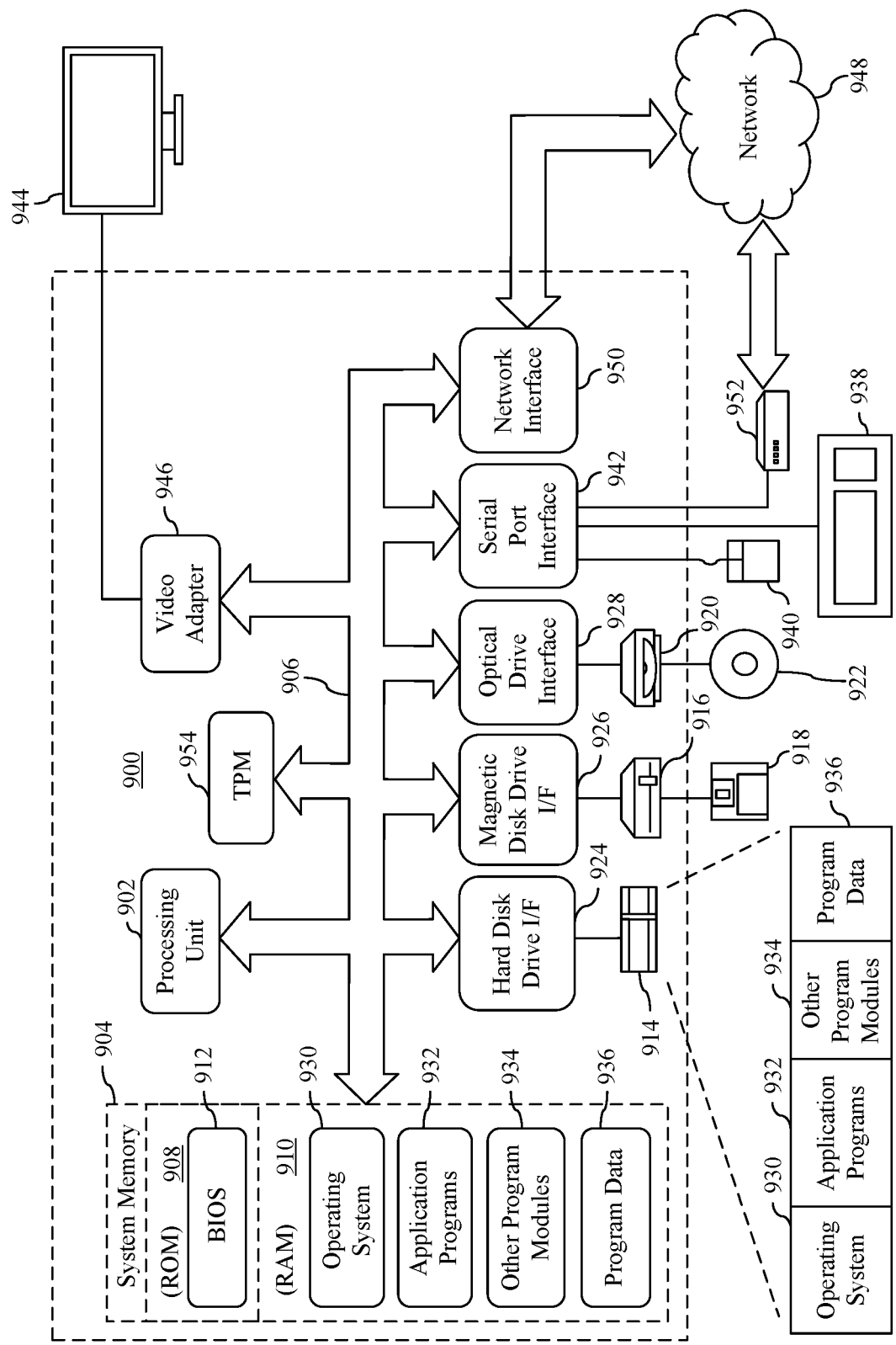
FIG. 9 shows a block diagram of an example computing device that may be used to implement embodiments.

FIG. 9 depicts an exemplary implementation of a computing device 900 in which embodiments may be implemented. For example, embodiments described herein may be implemented in one or more computing devices or systems similar to computing device 900, or multiple instances of computing device 900, in stationary or mobile computer embodiments, including one or more features of computing device 900 and/or alternative features. The description of computing device 900 provided herein is provided for purposes of illustration, and is not intended to be limiting. Embodiments may be implemented in further types of computer systems, servers, and/or clusters, etc., as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing embodiments described herein, such as but not limited to, s system 100 in FIG. 1 and system 200 in FIG. 2, along with any components and/or subcomponents thereof, as well as the flowcharts/flow diagrams described herein, including portions thereof, and/or further examples described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

TPM 954 may be connected to bus 906, and may be an embodiment of any TPM, as would be understood by one of skill in the relevant art(s) having the benefit of this disclosure. For example, TPM 954 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including memory 920 of FIG. 9). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for detecting and mitigating abusive network activity based on versioned browser usage. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The additional examples and embodiments described in this Section may be applicable to examples disclosed in any other Section or subsection of this disclosure.

Embodiments in this description provide for systems, devices, and methods for detecting and mitigating abusive network activity based on versioned browser usage. For instance, a method performed by a computing system for detecting and mitigating abusive network activity is described. The method includes generating a past usage value for a legacy version of a web browser wherein the legacy version of the web browser is older than a current version of the web browser, wherein the past usage value represents benign network activity associated with active instances of the legacy version over the past time period, and wherein the past usage value corresponds to a portion of a past time period; monitoring current network activity over a current time period; determining a current usage value for the legacy version of the web browser over the current time period; and performing a network action based at least on the current usage value deviating from the past usage value.

In an embodiment, the method further includes: selecting the network action from a plurality of network actions based at least on one or more parameters including: an age of the legacy version of the web browser; a magnitude of the current usage value; a comparison of the current usage value to the past usage value; a correspondence of the current usage value to a geographic location; and a correspondence of the current usage value to an operating system.

In an embodiment, the network action is at least one of: blocking future network activity for the legacy version of the web browser; issuing a human-capable challenge for the legacy version of the web browser; issuing a human-capable challenge for the legacy version of the web browser that correspond to the geographic location or to the operating system; decreasing a quality of service (QoS) for the future network activity; or allowing the future network activity.

In an embodiment, the method further includes: identifying a new version of the web browser that has been implemented at an implementation time based on the current network activity; assigning the current version of the web browser as another legacy version of the web browser; generating, based the new version of the web browser being implemented, another past usage value for the other legacy version of the web browser, wherein the other past usage value represents benign network activity associated with active instances of the other legacy version over another portion of the past time period since the implementation time; monitoring new network activity over a new current time period; determining another current usage value for the other legacy version of the web browser over the new current time period; and performing a network action based at least on the other current usage value deviating from the other past usage value.

In an embodiment of the method, the past usage value corresponds to a most recent portion of the past time period.

In an embodiment of the method, generating the past usage value for the legacy version of the web browser includes: generating a set of past usage values representing benign network activity associated with active instances of the legacy version over respective portions of the past time period, wherein each of the past usage values in the set is associated with a monotonically decreasing progression of the active instances of the legacy version over the past time period; and performing for each past usage value in the set a generation operation comprising: determining a respective lower bound parameter that corresponds to a percentage of past network activity in the respective portion of the past time period that is benign, and normalizing, based at least on the respective lower bound parameter, a distribution of the past network activity in the respective portion of the past time period to generate the past usage value.

In an embodiment, the method further includes: determining that the past time period includes a new portion thereof associated with a more recent time; generating for the set of past usage values a new past usage value according to the generation operation, the new past usage value corresponding to the new portion of the past time period; adding the new past usage value to the set of past usage values; and designating the new past usage value as the past usage value.

A computing system for detecting and mitigating abusive network activity is also described herein. The computing system includes a program memory that stores program code, and a processing system, based on the program code, to: generate a past usage value for a legacy version of a web browser wherein the legacy version of the web browser is older than a current version of the web browser, wherein the past usage value represents benign network activity associated with active instances of the legacy version over the past time period, and wherein the past usage value corresponds to a portion of a past time period; monitor current network activity over a current time period; determine a current usage value for the legacy version of the web browser over the current time period; and perform a network action based at least on the current usage value deviating from the past usage value.

In an embodiment of the computing system, the processing system, in response to receiving the program code, is to: select the network action from a plurality of network actions based at least on one or more parameters including: an age of the legacy version of the web browser; a magnitude of the current usage value; a comparison of the current usage value to the past usage value; a correspondence of the current usage value to a geographic location; and a correspondence of the current usage value to an operating system.

In an embodiment of the computing system, the network action is at least one of: blocking future network activity for the legacy version of the web browser; issuing a human-capable challenge for the legacy version of the web browser; issuing a human-capable challenge for the legacy version of the web browser that corresponds to the geographic location or to the operating system; decreasing a quality of service (QoS) for the future network activity; or allowing the future network activity.

In an embodiment of the computing system, the processing system, in response to receiving the program code, is to: identify a new version of the web browser that has been implemented at an implementation time based on the current network activity; assign the current version of the web browser as another legacy version of the web browser; generate, based the new version of the web browser being implemented, another past usage value for the other legacy version of the web browser, wherein the other past usage value represents benign network activity associated with active instances of the other legacy version over another portion of the past time period since the implementation time; monitor new network activity over anew current time period; determine another current usage value for the other legacy version of the web browser over the new current time period; and perform a network action based at least on the other current usage value deviating from the other past usage value.

In an embodiment of the computing system, the past usage value corresponds to a most recent portion of the past time period.

In an embodiment of the computing system, the processing system, in response to receiving the program code, to generate the past usage value for the legacy version of the web browser, is to: generate a set of past usage values representing benign network activity associated with active instances of the legacy version over respective portions of the past time period, wherein each of the past usage values in the set is associated with a monotonically decreasing progression of the active instances of the legacy version over the past time period; perform for each past usage value in the set a generation operation including to: determine a respective lower bound parameter that corresponds to a percentage of past network activity in the respective portion of the past time period that is benign, and normalize, based at least on the respective lower bound parameter, a distribution of the past network activity in the respective portion of the past time period to generate the past usage value.

In an embodiment of the computing system, the processing system, in response to receiving the program code, is to: determine that the past time period includes a new portion thereof associated with a more recent time; generate for the set of past usage values a new past usage value according to the generation operation, the new past usage value corresponding to the new portion of the past time period; add the new past usage value to the set of past usage values; and designate the new past usage value as the past usage value.

A computer-readable storage medium having program instructions recorded thereon that, when executed by a processing system, perform a method for detecting and mitigating abusive network activity, is also described. The method includes generating a past usage value for a legacy version of a web browser wherein the legacy version of the web browser is older than a current version of the web browser, wherein the past usage value represents benign network activity associated with active instances of the legacy version over the past time period, and wherein the past usage value corresponds to a portion of a past time period; monitoring current network activity over a current time period; determining a current usage value for the legacy version of the web browser over the current time period; and performing a network action based at least on the current usage value deviating from the past usage value.

In an embodiment of the computer-readable storage medium, the method further includes: selecting the network action from a plurality of network actions based at least on one or more parameters including: an age of the legacy version of the web browser; a magnitude of the current usage value; a comparison of the current usage value to the past usage value; a correspondence of the current usage value to a geographic location; and a correspondence of the current usage value to an operating system.

In an embodiment of the computer-readable storage medium, the network action is at least one of: blocking future network activity for the legacy version of the web browser; issuing a human-capable challenge for the legacy version of the web browser; issuing a human-capable challenge for the legacy version of the web browser that corresponds to the geographic location or to the operating system; decreasing a quality of service (QoS) for the future network activity; or allowing the future network activity.

In an embodiment of the computer-readable storage medium, the method further includes: identifying a new version of the web browser that has been implemented at an implementation time based on the current network activity; assigning the current version of the web browser as another legacy version of the web browser; generating, based the new version of the web browser being implemented, another past usage value for the other legacy version of the web browser, wherein the other past usage value represents benign network activity associated with active instances of the other legacy version over another portion of the past time period since the implementation time; monitoring new network activity over a new current time period; determining another current usage value for the other legacy version of the web browser over the new current time period; and performing a network action based at least on the other current usage value deviating from the other past usage value.

In an embodiment of the computer-readable storage medium, generating the past usage value for the legacy version of the web browser further includes: generating a set of past usage values representing benign network activity associated with active instances of the legacy version over respective portions of the past time period, wherein each of the past usage values in the set is associated with a monotonically decreasing progression of the active instances of the legacy version over the past time period; performing for each past usage value in the set a generation operation comprising: determining a respective lower bound parameter that corresponds to a percentage of past network activity in the respective portion of the past time period that is benign, and normalizing, based at least on the respective lower bound parameter, a distribution of the past network activity in the respective portion of the past time period to generate the past usage value.

In an embodiment of the computer-readable storage medium, the method further includes: determining that the past time period includes a new portion thereof associated with a more recent time; generating for the set of past usage values a new past usage value according to the generation operation, the new past usage value corresponding to the new portion of the past time period; adding the new past usage value to the set of past usage values; and designating the new past usage value as the past usage value.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method performed by a computing system for detecting and mitigating abusive network activity, the method comprising:
generating a past usage value for a legacy version of a web browser wherein the legacy version of the web browser is older than a current version of the web browser, wherein the past usage value represents benign network activity associated with active instances of the legacy version over a past time period, and wherein the past usage value corresponds to a portion of the past time period;
monitoring current network activity over a current time period;
determining a current usage value for the legacy version of the web browser over the current time period, the determined current usage value taking into account a determined lower bound on a fraction of benign network activity associated with the legacy version during the time period; and
performing a network action based at least on the current usage value deviating from the past usage value.

2. The method of claim 1, further comprising:
selecting the network action from a plurality of network actions based at least on one or more parameters including:
an age of the legacy version of the web browser;
a magnitude of the current usage value;
a comparison of the current usage value to the past usage value;
a correspondence of the current usage value to a geographic location; and
a correspondence of the current usage value to an operating system.

3. The method of claim 2, wherein the network action is at least one of:
blocking future network activity for the legacy version of the web browser;
issuing a human-capable challenge for the legacy version of the web browser;
issuing a human-capable challenge for the legacy version of the web browser that correspond to the geographic location or to the operating system;
decreasing a quality of service (QOS) for the future network activity; or
allowing the future network activity.

4. The method of claim 1, further comprising:
identifying a new version of the web browser that has been implemented at an implementation time based on the current network activity;
assigning the current version of the web browser as another legacy version of the web browser;
generating, based on the new version of the web browser being implemented, another past usage value for the other legacy version of the web browser, wherein the other past usage value represents benign network activity associated with active instances of the other legacy version over another portion of the past time period since the implementation time;
monitoring new network activity over a new current time period;
determining another current usage value for the other legacy version of the web browser over the new current time period; and
performing a network action based at least on the other current usage value deviating from the other past usage value.

5. The method of claim 1, wherein the past usage value corresponds to a most recent portion of the past time period.

6. The method of claim 1, wherein generating the past usage value for the legacy version of the web browser includes:
generating a set of past usage values representing benign network activity associated with active instances of the legacy version over respective portions of the past time period, wherein each of the past usage values in the set is associated with a monotonically decreasing progression of the active instances of the legacy version over the past time period; and
performing for each past usage value in the set a generation operation comprising:
determining a respective lower bound parameter that corresponds to a percentage of past network activity in the respective portion of the past time period that is benign; and
normalizing, based at least on the respective lower bound parameter, a distribution of the past network activity in the respective portion of the past time period to generate the past usage value.

7. The method of claim 6, further comprising:
determining that the past time period includes a new portion thereof associated with a more recent time;
generating for the set of past usage values a new past usage value according to the generation operation, the new past usage value corresponding to the new portion of the past time period;
adding the new past usage value to the set of past usage values; and
designating the new past usage value as the past usage value.

8. A computing system for detecting and mitigating abusive network activity, the computing system comprising:
a program memory that stores program code; and
a processing system, based on the program code to:
generate a past usage value for a legacy version of a web browser wherein the legacy version of the web browser is older than a current version of the web browser, wherein the past usage value represents benign network activity associated with active instances of the legacy version over a past time period, and wherein the past usage value corresponds to a portion of the past time period;
monitor current network activity over a current time period;
determine a current usage value for the legacy version of the web browser over the current time period, the determined current usage value taking into account a determined lower bound on a fraction of benign network activity associated with the legacy version during the time period; and
perform a network action based at least on the current usage value deviating from the past usage value.

9. The computing system of claim 8, wherein the processing system, in response to receiving the program code, is to:
select the network action from a plurality of network actions based at least on one or more parameters including:
an age of the legacy version of the web browser;
a magnitude of the current usage value;
a comparison of the current usage value to the past usage value;
a correspondence of the current usage value to a geographic location; and
a correspondence of the current usage value to an operating system.

10. The computing system of claim 9, wherein the network action is at least one of:
blocking future network activity for the legacy version of the web browser;
issuing a human-capable challenge for the legacy version of the web browser;

issuing a human-capable challenge for the legacy version of the web browser that corresponds to the geographic location or to the operating system;
decreasing a quality of service (QOS) for the future network activity; or
allowing the future network activity.

11. The computing system of claim 10, wherein the processing system, in response to receiving the program code, is to:
identify a new version of the web browser that has been implemented at an implementation time based on the current network activity;
assign the current version of the web browser as another legacy version of the web browser;
generate, based on the new version of the web browser being implemented, another past usage value for the other legacy version of the web browser, wherein the other past usage value represents benign network activity associated with active instances of the other legacy version over another portion of the past time period since the implementation time;
monitor new network activity over a new current time period;
determine another current usage value for the other legacy version of the web browser over the new current time period; and
perform a network action based at least on the other current usage value deviating from the other past usage value.

12. The computing system of claim 8, wherein the past usage value corresponds to a most recent portion of the past time period.

13. The computing system of claim 8, wherein the processing system, in response to receiving the program code, to generate the past usage value for the legacy version of the web browser, is to:
generate a set of past usage values representing benign network activity associated with active instances of the legacy version over respective portions of a past time period, wherein each of the past usage values in the set is associated with a monotonically decreasing progression of the active instances of the legacy version over the past time period; and
perform for each past usage value in the set a generation operation including to:
determine a respective lower bound parameter that corresponds to a percentage of past network activity in the respective portion of the past time period that is benign; and
normalize, based at least on the respective lower bound parameter, a distribution of the past network activity in the respective portion of the past time period to generate the past usage value.

14. The computing system of claim 13, wherein the processing system, in response to receiving the program code, is to:
determine that the past time period includes a new portion thereof associated with a more recent time;
generate for the set of past usage values a new past usage value according to the generation operation, the new past usage value corresponding to the new portion of the past time period;
add the new past usage value to the set of past usage values; and
designate the new past usage value as the past usage value.

15. A computer-readable storage medium having program instructions recorded thereon that, when executed by a processing system, perform a method for detecting and mitigating abusive network activity, the method comprising:
generating a past usage value for a legacy version of a web browser wherein the legacy version of the web browser is older than a current version of the web browser, wherein the past usage value represents benign network activity associated with active instances of the legacy version over the past time period, and wherein the past usage value corresponds to a portion of a past time period;
monitoring current network activity over a current time period;
determining a current usage value for the legacy version of the web browser over the current time period, the determined current usage value taking into account a determined lower bound on a fraction of benign network activity associated with the legacy version during the time period; and
performing a network action based at least on the current usage value deviating from the past usage value.

16. The computer-readable storage medium of claim 15, wherein the method further comprises:
selecting the network action from a plurality of network actions based at least on one or more parameters including:
an age of the legacy version of the web browser;
a magnitude of the current usage value;
a comparison of the current usage value to the past usage value;
a correspondence of the current usage value to a geographic location; and
a correspondence of the current usage value to an operating system.

17. The computer-readable storage medium of claim 16, wherein the network action is at least one of:
blocking future network activity for the legacy version of the web browser;
issuing a human-capable challenge for the legacy version of the web browser;
issuing a human-capable challenge for the legacy version of the web browser that corresponds to the geographic location or to the operating system;
decreasing a quality of service (QOS) for the future network activity; or
allowing the future network activity.

18. The computer-readable storage medium of claim 15, wherein the method further comprises:
identifying a new version of the web browser that has been implemented at an implementation time based on the current network activity;
assigning the current version of the web browser as another legacy version of the web browser;
generating, based on the new version of the web browser being implemented, another past usage value for the other legacy version of the web browser, wherein the other past usage value represents benign network activity associated with active instances of the other legacy version over another portion of the past time period since the implementation time;
monitoring new network activity over a new current time period;
determining another current usage value for the other legacy version of the web browser over the new current time period; and performing a network action based at least on the other current usage value deviating from the other past usage value.

19. The computer-readable storage medium of claim 15, wherein generating the past usage value for the legacy version of the web browser further comprises:
- generating a set of past usage values representing benign network activity associated with active instances of the legacy version over respective portions of the past time period, wherein each of the past usage values in the set is associated with a monotonically decreasing progression of the active instances of the legacy version over the past time period; and
- performing for each past usage value in the set a generation operation comprising:
  - determining a respective lower bound parameter that corresponds to a percentage of past network activity in the respective portion of the past time period that is benign; and
  - normalizing, based at least on the respective lower bound parameter, a distribution of the past network activity in the respective portion of the past time period to generate the past usage value.

20. The computer-readable storage medium of claim 19, wherein the method further comprises:
- determining that the past time period includes a new portion thereof associated with a more recent time;
- generating for the set of past usage values a new past usage value according to the generation operation, the new past usage value corresponding to the new portion of the past time period;
- adding the new past usage value to the set of past usage values; and
- designating the new past usage value as the past usage value.

* * * * *